(12) United States Patent
Weber

(10) Patent No.: US 6,784,920 B2
(45) Date of Patent: *Aug. 31, 2004

(54) FISHING SURVEILLANCE DEVICE

(76) Inventor: Eric D. Weber, 309 Haugh Dr., Pittsburgh, PA (US) 15237

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 727 days.

(21) Appl. No.: 09/557,718

(22) Filed: Apr. 25, 2000

(65) Prior Publication Data

US 2001/0040623 A1 Nov. 15, 2001

Related U.S. Application Data

(62) Division of application No. 08/813,363, filed on Mar. 7, 1997, now Pat. No. 0,657,879.
(60) Provisional application No. 60/013,125, filed on Mar. 11, 1996.

(51) Int. Cl.$^7$ ................................................. H04N 7/18
(52) U.S. Cl. ................................ 348/81; 439/459; 43/4
(58) Field of Search ........................... 348/81, 82, 83, 348/85, 65, 66, 71, 79, 163; 43/4, 17.5, 3; 367/173, 165; 439/459; 358/108, 225, 99; H04N 7/18

(56) References Cited

U.S. PATENT DOCUMENTS

| | | | | |
|---|---|---|---|---|
| 2,760,417 A | | 8/1956 | Laval, Jr. .......................... 95/11 |
| 3,382,598 A | | 5/1968 | Wilson ............................ 43/17 |
| 3,738,248 A | * | 6/1973 | Fish et al. ....................... 95/86 |
| 3,916,094 A | * | 10/1975 | Marrone ......................... 178/6 |
| 4,051,523 A | | 9/1977 | Laikin et al. ................... 358/99 |
| 4,069,469 A | * | 1/1978 | Masaharu ..................... 340/5 R |
| 4,155,669 A | * | 5/1979 | Rochelle ....................... 405/158 |
| 4,300,216 A | | 11/1981 | Barton, Jr. .................... 367/113 |
| D275,571 S | * | 9/1984 | Carrington ..................... D16/2 |
| 4,485,398 A | * | 11/1984 | Chapin, Jr. et al. ........... 358/50 |
| 4,495,722 A | | 1/1985 | Hess et al. .................. 43/42.39 |
| 4,644,511 A | | 2/1987 | Asakura ...................... 367/101 |
| 4,648,345 A | * | 3/1987 | Wham et al. ................ 114/338 |
| 4,661,855 A | | 4/1987 | Gëlck .......................... 358/225 |
| 4,721,055 A | * | 1/1988 | Pado ........................... 114/331 |
| 4,744,331 A | * | 5/1988 | Whiffin .......................... 119/3 |
| 4,815,815 A | * | 3/1989 | Mori ........................ 350/96.24 |
| 4,817,328 A | | 4/1989 | Hartley et al. ............. 43/43.12 |
| 4,918,472 A | * | 4/1990 | Reed ............................ 354/64 |
| 4,963,962 A | | 10/1990 | Kruegle et al. ............. 358/108 |
| 5,003,723 A | | 4/1991 | Dutcher et al. ............ 43/42.13 |
| 5,072,540 A | | 12/1991 | Monzyk et al. .................. 43/4 |
| 5,140,927 A | * | 8/1992 | Tolefson ...................... 114/244 |
| 5,205,061 A | | 4/1993 | Echols, Jr. .................... 43/17.5 |
| 5,327,398 A | | 7/1994 | Wansley et al. ............ 367/108 |
| 5,414,951 A | | 5/1995 | Martin ........................ 43/17.5 |
| 5,463,597 A | | 10/1995 | Harley ........................ 367/107 |
| 5,495,689 A | | 3/1996 | Cassem ....................... 43/17.1 |
| 5,546,362 A | | 8/1996 | Baumann et al. ........... 367/173 |
| 5,581,930 A | | 12/1996 | Langer ........................... 43/17 |
| 5,764,061 A | * | 6/1998 | Asakawa et al. ........... 324/326 |
| 5,771,205 A | | 6/1998 | Currier et al. .............. 367/107 |
| 5,778,259 A | | 7/1998 | Rink ............................ 396/27 |
| 5,938,469 A | | 8/1999 | Ford et al. ................... 439/459 |

\* cited by examiner

*Primary Examiner*—Tung T. Vo
(74) *Attorney, Agent, or Firm*—Webb Ziesenheim Logsdon Orkin & Hanson, P.C.

(57) ABSTRACT

An underwater surveillance apparatus includes a watertight housing having a transparent part and a video tube received in the watertight housing. The video tube has a light receiving end positioned to view through the transparent part of the watertight housing. A video cable extends from the video tube to a video monitor disposed above a surface of the body of water. The watertight housing is configured such that the transparent part of the watertight housing is urged in a direction downstream when the watertight housing is submerged in a body of fluid moving relative to the watertight housing.

3 Claims, 4 Drawing Sheets

FISHING SURVEILLANCE DEVICE

CROSS REFERENCE TO RELATED APPLICATIONS

This application division from U.S. patent application Ser. No. 08/813,363 filed Mar. 7, 1997, entitled "Fishing Surveillance Device", which claims priority from U.S. Provisional Patent Application Ser. No. 60/013,125, filed Mar. 11, 1996.

BACKGROUND OF THE INVENTION

1. Field of the Invention

This invention relates to fishing and, more particularly, to an apparatus for viewing fish during fishing and a method for using the apparatus.

2. Description of the Prior Art

In recent years, fishermen have taken advantage of technological advances to improve their performance. These advances include, for example, satellite services that provide up-to-the-minute ocean currents and water temperatures to better locate fish. Utilizing this information, modified radar systems are utilized to detect exact locations on the water and modified sonar is utilized to detect the exact location of fish in the water. Fishing poles are made out of space age materials for strength and sensitivity and computer designed lures imitate the exact motions of the prey they are modeled after.

In spite of these advances, fishermen still lack specific real time information regarding the fishing environment and the actions of any fish that are present. More specifically, there is no provision for detecting the presence and/or desirability of fish, the attractiveness of bait or lure to the fish, whether the rig is configured properly, whether the fish are striking the bait or merely taking investigatory nibbles, the proper time of applying a hooking yank, whether the fish is hooked and how aggressively the fish should be reeled in.

Heretofore, prior art solutions have been utilized to locate fish. However, these prior art devices do not enable a fisherman to obtain accurate information about the foregoing real time variables.

It is, therefore, an object of the present invention to provide a submersible camera that is utilized with a fishing line to detect the presence and desirability of fish, the attractiveness of bait or lure to the fish, whether the rig is configured properly, whether the fish is striking the bait or lure or merely taking investigatory nibbles, the proper time to apply a hooking yank, whether the fish is hooked and how aggressively the fish should be reeled in. It is an object of the present invention to provide a submersible camera that is easily attachable to a fishing line and is easy and entertaining to use. It is an object of the present invention to provide a fishing apparatus that enables a visual record of a fishing catch to be recorded. Still other objects will become apparent to those of ordinary skill in the art upon reading and understanding the following detailed description.

SUMMARY OF THE INVENTION

Accordingly, I have invented an underwater surveillance apparatus comprising a watertight housing having a transparent part and a video tube received in the watertight housing. The video tube has a light receiving end positioned to view through the transparent part of the watertight housing. A video cable extends from the video tube to a video monitor disposed above the surface of the water. The watertight housing is configured such that the transparent part of the watertight housing is urged in a direction downstream when the watertight housing is submerged in a body of fluid moving relative to the watertight housing.

An optical lens can be attached to the light receiving end of the video tube and the transparent part of the watertight housing can be disposed at an end thereof.

A positioning means can be used for positioning the watertight housing in the body of fluid moving relative to the watertight housing. Preferably, the positioning means includes one or more fins attached to the watertight housing for orienting the watertight housing in a body of fluid moving relative to the watertight housing.

I have also invented a submersible camera for use in viewing fish in a body of water. The camera includes a watertight housing having a transparent end and a video tube received in the watertight housing. The video tube has a light receiving end positioned to view through the transparent end of the watertight housing. A video cable extends from the video tube to a video monitor disposed above a surface of the water. The camera is configured such that, in response to relative movement between the water of the body of water and the watertight housing, the light receiving end of the video tube orients to view in a direction downstream of the watertight housing.

DETAILED DESCRIPTION OF THE PREFERRED EMBODIMENTS

Figure 1:
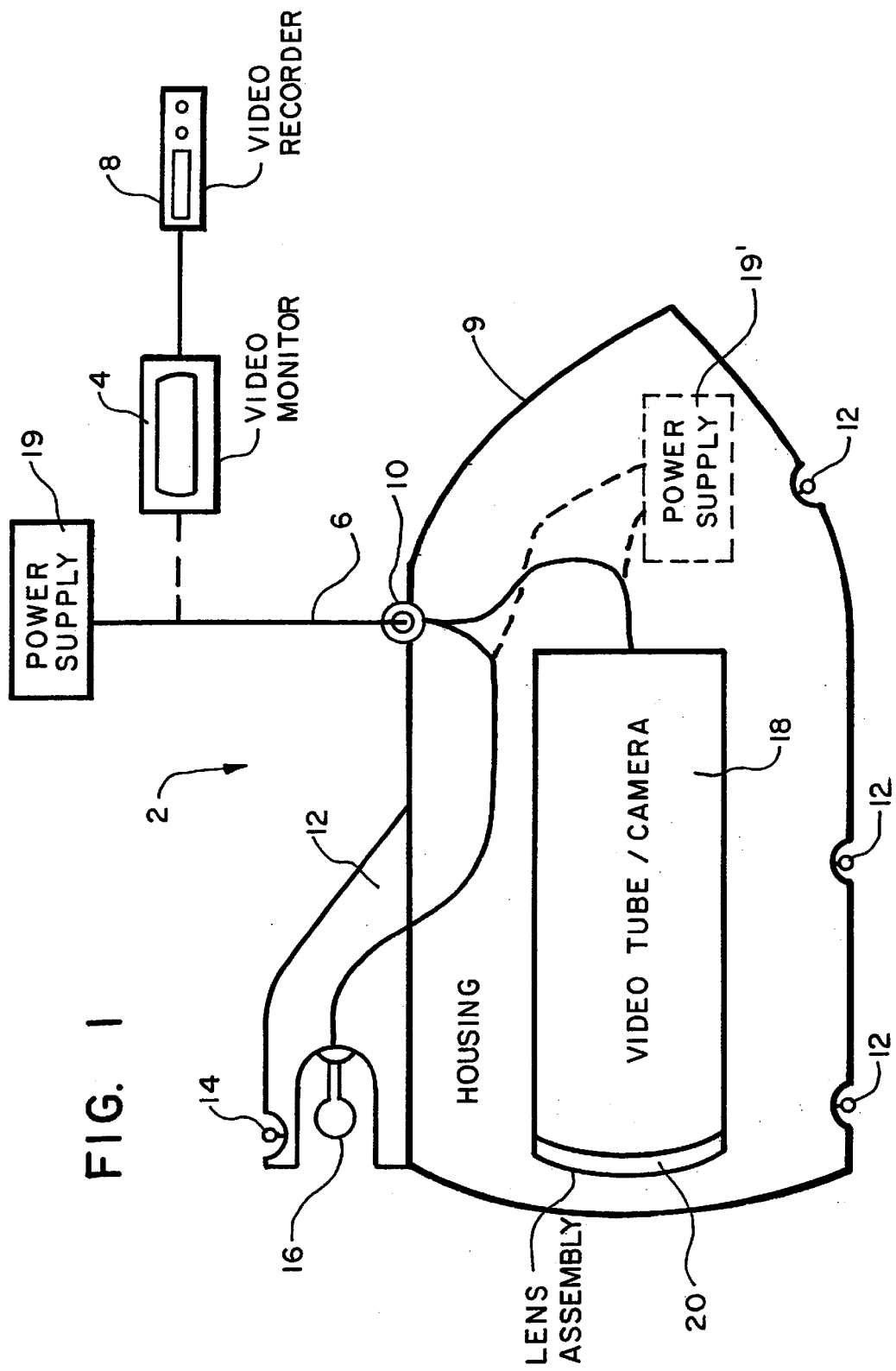
FIG. 1 is a side sectional view of a submersible camera.

A submersible camera 2 is connected to a video monitor 4 via a video cable 6. A video recorder 8 is optionally attached to the video monitor 4 for recording visual images displayed thereon. A microphone (not shown) is optionally attached to video recorder 8 to record narration of a human operator.

The submersible camera 2 includes a torpedo-shaped housing 9 having a support eyelet 10 attached adjacent one end thereof for attaching the housing 9 to the video cable 6. A fin 12 is attached to the end of the housing 9 opposite the support eyelet 10. The fin 12 extends radially outward from the housing 9. Attached to an edge of the fin 12 positioned away from the housing 9 is a swivel eyelet 14.

The side of the fin 12 adjacent the end of the housing 9 includes a slot 15 adapted to receive a light source 16 therein. The light source 16 is a submersible lightbulb or a lightbulb contained in a transparent housing (not shown).

A video tube or camera 18 is positioned inside the housing 9 with the longitudinal axis of the video tube 18 parallel with the longitudinal axis of the housing 9. Housing 9 is adapted to be watertight so that fluid, and in particular water, does not enter the housing 9 and come into contact with the video tube 18. The video tube 18 contains processing electronics (not shown) to convert video images received thereby to electronic signals. The electronic signals from the video tube 18 are transmitted to the video monitor 4 via the video cable 6. The video cable 6 is also utilized to provide power to the video tube 18 from a power supply 19 positioned remote from the housing 9. Alternatively, a power supply 19' is positioned in the housing 9 to provide power to the video tube 18. The power supply 19 or 19' can also provide power to the light source 16 and other gauges or devices carried by housing 9.

The end of the video tube 18 adjacent the fin 12 has a lens assembly 20 positioned thereon. The lens assembly 20 may include a fixed or replaceable lens for focusing the light received thereby onto a receiving array and/or an adjustable iris for controlling the amount of light received by the receiving array. The lens, adjustable iris and receiving array are omitted from FIG. 1 for simplicity. The end of the housing adjacent the lens assembly 20 is transparent so that light can pass therethrough from outside the housing 9 for receipt by the lens assembly 20.

Figure 2C:
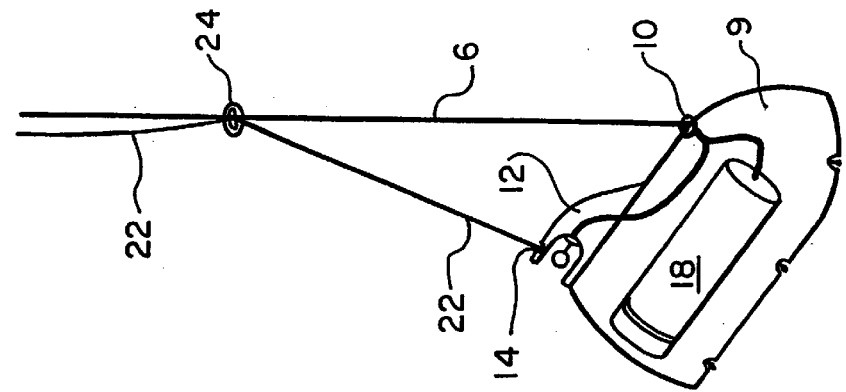
FIGS. 2a–2c are side sectional views of the submersible camera of FIG. 1 attached to a video cable and an adjustment cable for adjusting the angle of the submersible camera.
Figure 2B:
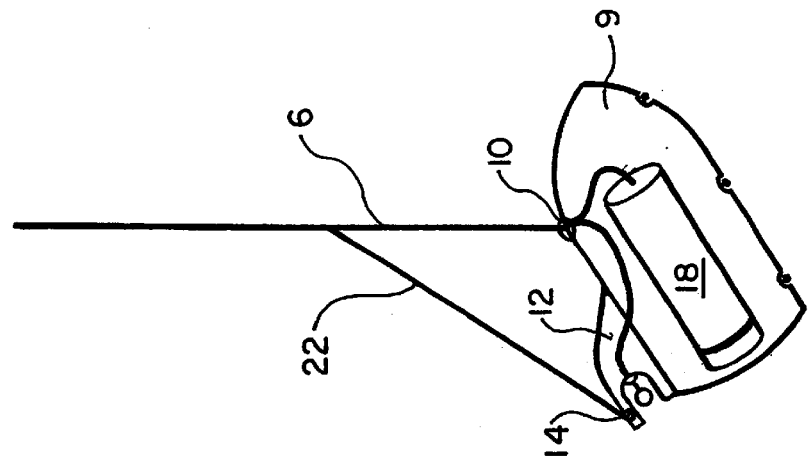
Figure 2A:
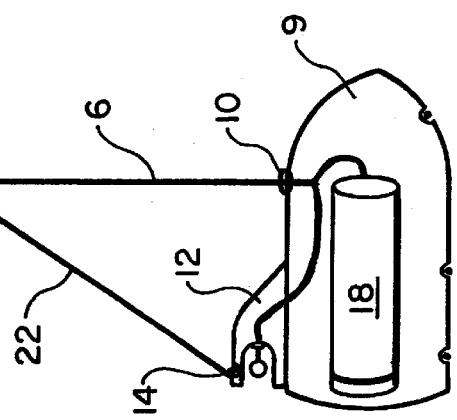

With reference to FIGS. 2a–2c, an adjustment cable 22 is attached between a position on the video cable 6 between the support eyelet 10 and the video monitor 4 and the swivel eyelet 14. The length of the adjustment cable 22 and the attachment of the adjustment cable 22 to the video cable 6 may be fixed. Alternatively, the adjustment cable 22 can be extended between the swivel eyelet 14 and an adjustment position above the surface of the water via a cable eyelet 24 attached to the video cable 6 between the support eyelet 10 and the video monitor 4. In this embodiment, the angle of the camera 2 to view the bait receiving end of the fishing line 30 (shown in FIGS. 3 and 4) can be adjusted by adjusting the length of the adjustment cable 22 between the cable eyelet 24 and the swivel eyelet 14.

Figure 3:
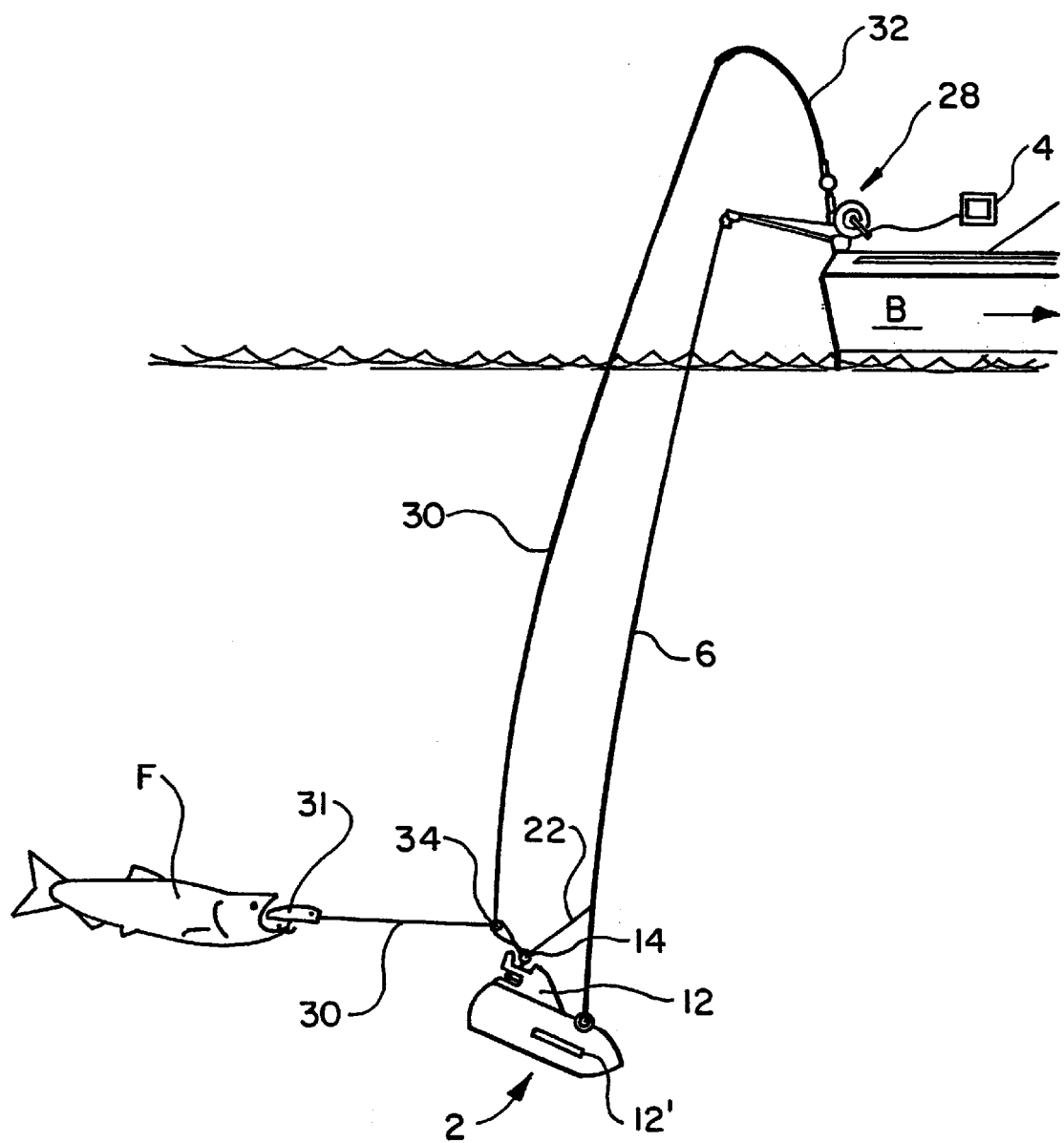
FIG. 3 is an illustration of the submersible camera of FIG. 1 attached to a fishing line and suspended in a body of water behind a moving boat.

With reference to FIG. 3, the submersible camera 2 is suspended in a body of water via the video cable 6 attached to a downrigger 28 which is attached to a boat B. Also suspended in the water is a fishing line 30 having a lure or bait 31 received at a bait receiving end thereof. Attached between swivel eyelet 14 and the fishing line 30 is a release clip 34. The release clip 34 releasably secures the submersible camera 2 to the fishing line 30 so that the submersible camera 2 can observe the bait receiving end of the fishing line 30 when the camera 2 and the bait receiving end of the fishing line 30 are submerged. The release clip 34 enables the submersible camera 2 and fishing line 30 to be separated. More specifically, the release clip 34 separates the fishing line 30 from the submersible camera 2 in response to the application of a hooking yank to the fishing line 30. In this manner, once a fish is hooked to the bait receiving end of the fishing line 30, the submersible camera 2 can be disengaged from the fishing line 30 to avoid potential damage to the submersible camera 2 or entanglement with the video cable 6 by the fish F trying to free itself from the fishing line 30.

By observing the video monitor 4, the fisherman can determine the appropriate moment to apply a hooking yank. Moreover, by observing the bait 31, the fisherman can assess the desirability of the lure or live bait 31 to the fish F. As shown in FIG. 3, the housing 9 of the submersible camera 2 may include additional fins 12' which enable the angle of the camera 2 to be controlled. These extra fins 12' may be fixed in position on the housing 9 or may be adjustable on the housing 9 to enable the angle of the housing 9 to be adjusted to suit a desired fishing environment, trolling speed or water current speed.

Figure 4:
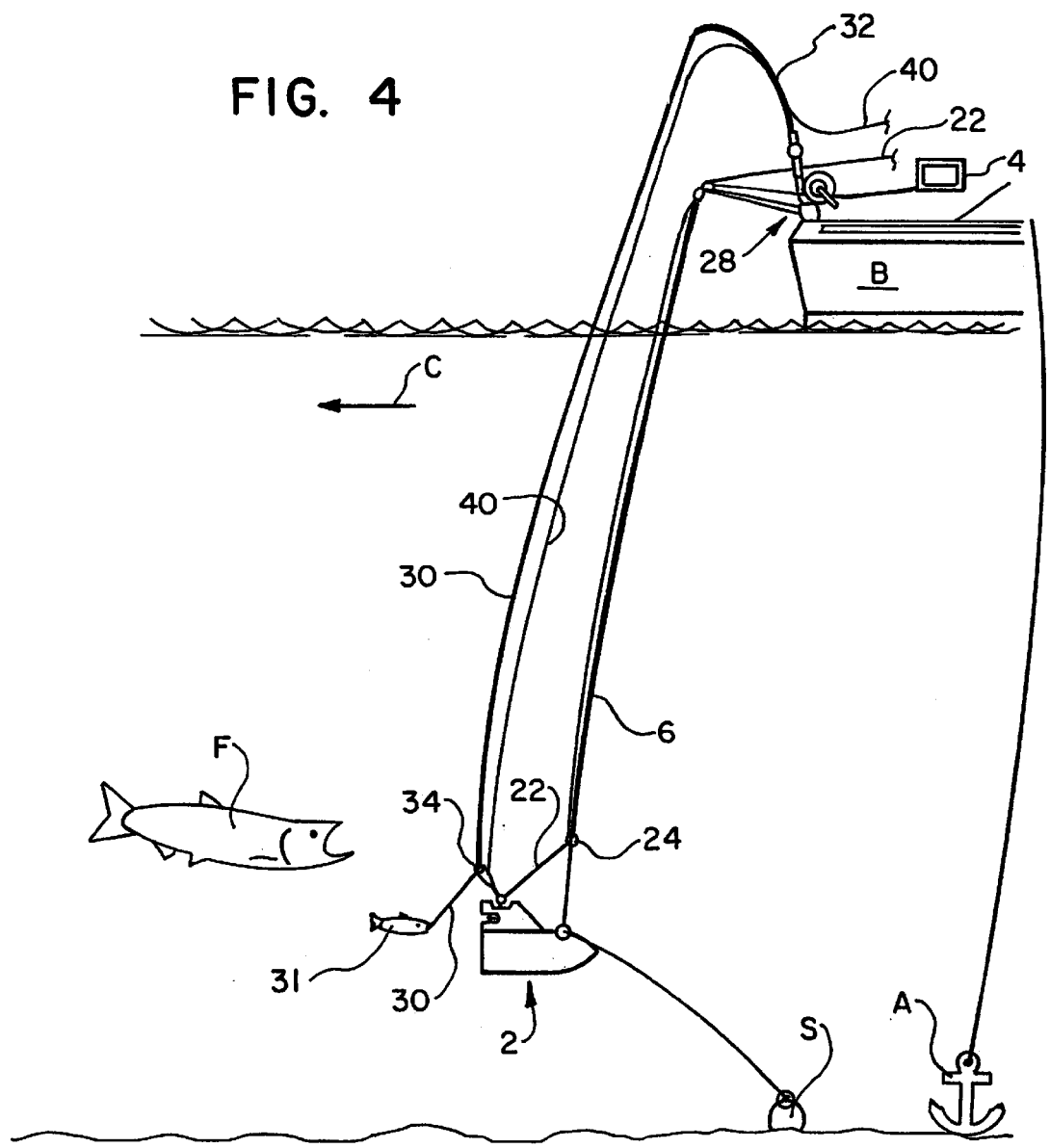
FIG. 4 is an illustration of the submersible camera of FIG. 1 attached to a fishing line and suspended in a body of moving water behind a stationary boat.

With reference to FIG. 4, boat B is held stationary on the surface of the water via anchor A. The submersible camera 2 is suspended in the body of water via the video cable 6 attached to the downrigger 28. A sinker S attached to support eyelet 10 is utilized to help maintain the position of the submersible camera 2 in the body of water. The fishing line 30 is also suspended in the body of water. The fishing line 30 has a lure or bait 31 attached to a bait receiving end thereof and is connected to a fishing pole 32 at an end opposite the bait receiving end. In this embodiment, the adjustment cable 22 is connected between the swivel eyelet 14 and a position on the boat B via cable eyelet 24. The release clip 34 is releasably attached between the submersible camera 2 and the fishing line 30. A release line 40 is attached between the release clip 34 and a position above the surface of the water and, preferably, on the boat B. Applying tension of a sufficient extent to the release line 40 causes the release clip 34 to release the fishing line 30 from the submersible camera 2. In the absence of tension of sufficient extent on the release line 40, the submersible camera 2 and the fishing line 30 remain connected via the release clip 34. In this manner, when a fish F is hooked on the bait receiving end of the fishing line 30, the struggle of the fish F against the fishing line 30 can be observed and/or recorded as desired.

In use, the fishing line 30 is releasably connected to the submersible camera 2. The camera 2 and the fishing line 30 are submerged so that the submerged camera 2 orients under the influence of water current C to view the bait receiving end of fishing line 30 and, more specifically, the lure or bait 31 attached to the bait receiving end of the fishing line 30. The submersible camera 2 transmits visual pictures of the bait receiving end of the fishing line 30 to the video monitor 4 for observation by a fisherman. At an appropriate time, a hooking yank is applied to the fishing line 30 to hook a fish thereon and the fishing line 30 is released from the submersible camera 2. The fishing line 30 is released from the submersible camera 2 by the application of the hooking yank to the fishing line 30 or by a fish F striking the lure or live bait 31 received on the bait receiving end of the fishing line 30. Alternatively, the fishing line 30 is released from the submersible camera 2 by applying tension to a release line 40 connected to the release clip 34 attached between the submersible camera 2 and the fishing line 30. Visual images displayed on the video monitor 4 can be recorded by a video recorder 8. Moreover, the angle of the submersible camera 2 relative to the bait receiving end of the fishing line 30 can be adjusted via the adjustment cable 22.

As can be seen from the foregoing, the present invention provides a visual indication of the presence and desirability of fish F, the attractiveness of the lure or bait 31 to the fish F, whether the fish F is striking the lure or bait 31 or merely taking investigatory nibbles, the proper time to apply the hooking yank, whether the fish F is hooked, and how aggressively the fish F should be reeled in.

The above invention has been described with reference to the preferred embodiments. Obvious modifications, combinations and alterations will occur to others upon reading and understanding the preceding detailed description. For example, the housing 9 can be permanently attached to the fishing line 30. Moreover, the present invention can be utilized to fish from freestanding structures such as a pier or bridge. Moreover, if an undesirable fish F approaches the lure or bait 31, the fisherman can move the lure or bait 31 in an undesirable manner to scare the undesirable fish F away. It is intended that the invention be construed as including all such modifications and alterations insofar as they come within the scope of the appended claims or the equivalents thereof.

I claim:

1. A submersible camera for fishing comprising:

an elongated fluid-tight housing having a housing body, a tapered front end and a transparent back end at opposite ends thereof; and a video tube received in the housing, the video tube having a lens assembly positioned adjacent the back end of the housing to receive light passing therethrough, wherein:

the housing is torpedo shaped; and when the camera is submerged in a stream of water, the housing body and front end coact to position the camera in the stream of water with the front end oriented upstream and with the back end oriented downstream.

2. A submersible camera for fishing comprising:

an elongated fluid-tight housing having a housing body, a tapered front end and a transparent back end at opposite ends thereof;

a fin attached to the housing adjacent the back end thereof, the fin having a longitudinal axis which extends parallel to a longitudinal axis of the housing; and a video tube received in the housing, the video tube having a lens assembly positioned adjacent the back end of the housing to receive light passing therethrough, wherein, when the camera is submerged in a stream of water, the housing body and front end coact to position the camera in the stream of water with the front end oriented upstream and with the back end oriented downstream.

3. The camera as set forth in claim 2, wherein the fin diverges away from the longitudinal axis of the housing with increasing distance from the first end of the housing.

* * * * *